United States Patent [19]

Alyfuku

[11] Patent Number: 4,982,212

[45] Date of Patent: Jan. 1, 1991

[54] BLANK FILM ADVANCE CONTROL DEVICE FOR CAMERA

[75] Inventor: Kiyoshi Alyfuku, Kanagawa, Japan

[73] Assignee: Canon Kabushiki Kaisha, Tokyo, Japan

[21] Appl. No.: 191,732

[22] Filed: May 2, 1988

[30] Foreign Application Priority Data

| Dec. 26, 1985 | [JP] | Japan | 60-294455 |
| Dec. 27, 1985 | [JP] | Japan | 60-297213 |
| Jan. 8, 1986 | [JP] | Japan | 61-001802 |
| Jan. 8, 1986 | [JP] | Japan | 61-001803 |

[51] Int. Cl.⁵ ............................................ G03B 1/00
[52] U.S. Cl. .................................. 354/173.1; 354/214
[58] Field of Search ............... 354/412, 173.1, 173.11, 354/214

[56] References Cited

U.S. PATENT DOCUMENTS

| 4,362,370 | 12/1982 | Iwata et al. | 354/173.11 |
| 4,662,736 | 5/1987 | Taniguchi et al. | 354/412 |
| 4,707,104 | 11/1987 | Inoue et al. | 354/173.11 |

FOREIGN PATENT DOCUMENTS 43441  3/1983  Japan ................... 354/173.1

Primary Examiner—W. B. Perkey
Attorney, Agent, or Firm—Fitzpatrick, Cella, Harper & Scinto

[57] ABSTRACT

The present patent application discloses a blank film advance control device for a camera, in which when the film loading cover is closed, the film is automatically advanced a prescribed number of blank frames. The device is provided with means for memorizing the fact that the advancing of the blank frames has completed and means for coordinating the memorizing means with the film loading cover to restore the memorizing state of the memory means at least until the film is rewound. With this, even if the film loading cover is accidentally opened and closed again after the end of the blank film advance, the camera is prevented from performing faulty operations, for example, a second cycle of blank film advance. Instead, it carries out a proper different operation from the first cycle of blank film advance which took place after the film loading cover was closed for the first time.

24 Claims, 8 Drawing Sheets

BLANK FILM ADVANCE CONTROL DEVICE FOR CAMERA

This application is a continuation of application Ser. No. 945,556, filed Dec. 23, 1986, now abandoned.

BACKGROUND OF THE INVENTION

1. Field of the Invention:

This invention relates to cameras, and more particularly to improvements in a blank film advance control device for automatically initiating a blank film advancing operation in response to insertion of a film cartridge into the camera followed by closure of the back cover.

2. Description of the Related Art:

In conventional cameras having the function of automatically advancing blank film, the coordination of the device therefor and the film cartridge chamber cover, or the back cover of the camera, has generally been controlled in such a manner that after the film cartridge has been inserted into the chamber, when the back cover is closed, the film is automatically advanced, for example, four frames, and thereby the camera is readied for taking photographs. The use of such coordination control has the disadvantage that even when the photographer carelessly re-opens the back cover after the camera had been loaded with film to the end of blank advance, the re-closure of the back cover actuates the blank film advance device to operate again in exactly the same manner. Thus, the blank film advance is recycled. Therefore, many drawbacks such as those discussed below have arisen.

For example, the automatic transition from the wind to the rewind mode has recently found increasing use in cameras. For example, as a definite number of frames have been exposed, this film stoppage is detected to automatically initiate a film rewinding operation. If this function were left effective even before the start of the blank film advance, failure of the blank film advance (i.e., such that the film leader is out of engagement on the takeup spool) would cause the film to move backward with the result that the film leader is all pulled into the cartridge. So, the film could no longer be used, while being left unexposed. To eliminate this problem, the prior art made a provision that automatic transition to the rewind mode is prevented from occurring before the end of the blank film advance.

In application of this technique to the conventional type camera in which the blank film advance is recycled each time the back cover is opened and closed, when the back cover is accidentally re-opened and re-closed after the end of the blank film advance as mentioned above, but just before the end of the film (the remaining number of fresh frames is, for example, three or less), it is unavoidable that the film is tensioned in the middle course of the second cycle of the blank film advancing operation, nevertheless the automatic function of switching the camera from the wind to the rewind mode does not work. In this case, therefore, the photographer has to rewind the film manually. This is very troublesome.

Another drawback arising from the possibility of recycling the blank film advance is that the frames which would otherwise be usable for taking photograph are advanced in vain. Thus, the use of the prior known coordination control of the blank film advance device with the back cover of the camera led to many serious problems.

SUMMARY OF THE INVENTION

A first object of the invention is to provide a blank film advance control device for a camera in which when a film loading cover is closed, the film is automatically advanced to a prescribed position, whereby means are provided for (1) memorizing the fact that the blank film advance is completed and (2) controlling the coordination of the memorizing means, the film loading cover and a film rewind actuating means in such a manner that despite the fact that the film loading cover is re-opened, the above described auto-load, success-memorizing state is restored at least until the start of the film rewinding operation. Thus the above-described problems of the prior art are not encountered even if the film loading cover is carelessly opened and closed again after the end of the blank film advance and before the film has all been exposed.

A second object of the invention is to provide for the above-described blank film advance control device for a camera with means responsive to storage of the completion of the first cycle of blank film advance in the above-described memory means for prohibiting a second cycle of blank film advance from occurring even when the film loading cover is accidentally opened and closed again, thus giving an advantage of saving the film frames which would not otherwise be exposed.

A third object of the invention is to provide the above-described camera blank film advance control device with means making automatic film rewind possible for the case where the completion of blank film advance is in storage on the above-described memory means, and the film loading cover has accidentally been opened and closed again. When the film stops (as this is taken as the end of film), the camera is automatically switched to the automatic rewind mode, thereby avoiding the troublesome necessity of manually rewinding the film which would otherwise be usual as in the prior art thus improving the manageability of the camera.

Other objects of the invention will become apparent from the following description of embodiments thereof.

DETAILED DESCRIPTION OF THE PREFERRED EMBODIMENTS

The present invention is next described in connection with embodiments thereof by reference to the drawings.

Figure 1:
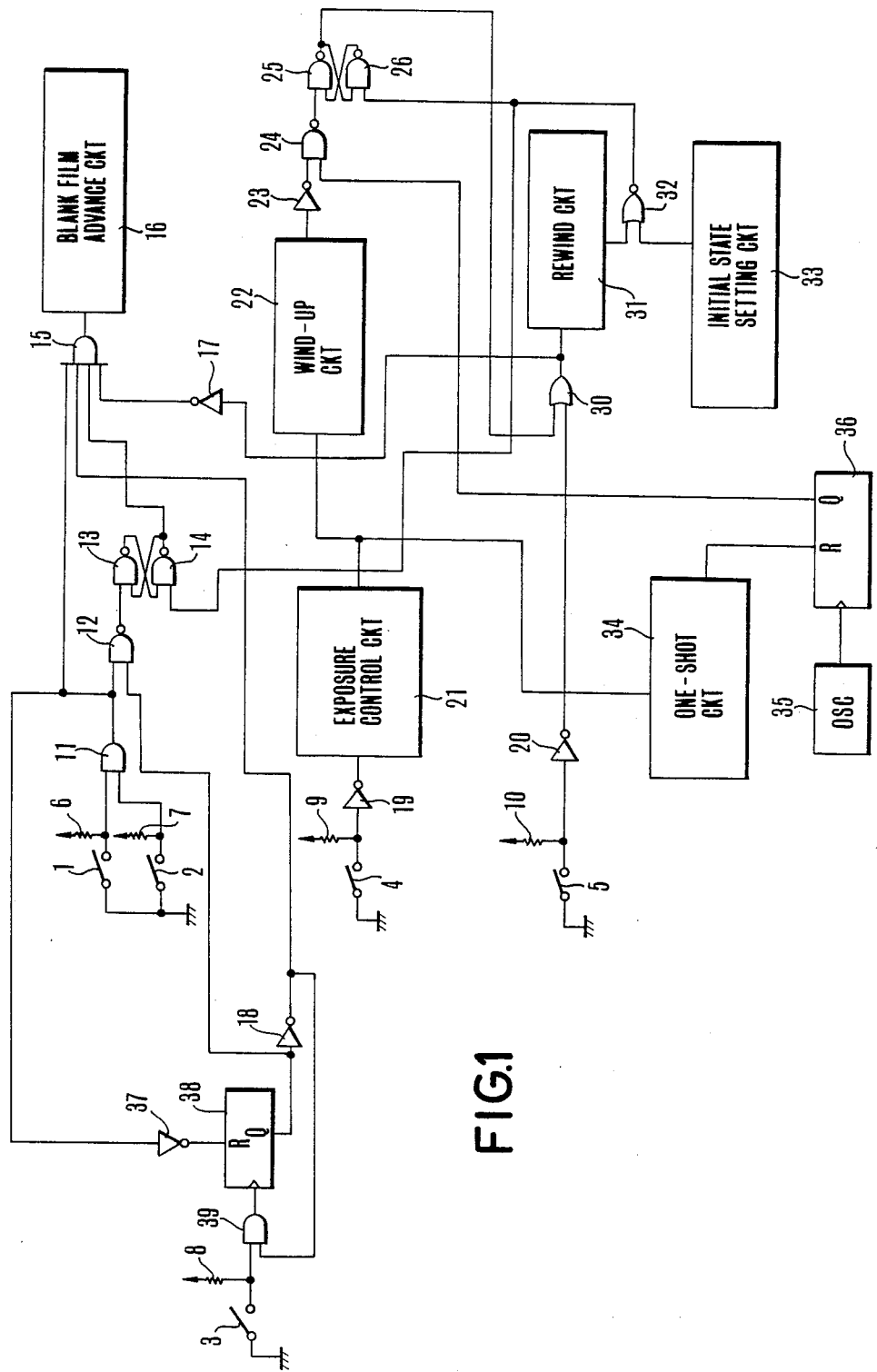
FIG. 1 is an electrical circuit diagram, partly in block form, of a first embodiment of the blank film advance control device for a camera according to the present invention.

In FIG. 1 there is shown the circuitry of the first embodiment of the blank film advance control device for a camera according to the present invention. The circuit of FIG. 1 includes a film switch 1 arranged to turn off when a film cartridge is inserted into and seated in a chamber within the camera housing, a back cover switch 2 arranged to turn off when the back cover is closed, and a sprocket switch 3 arranged to recycle the on-and-off operation when the film is moving past the film gate. Also shown in FIG. 1 are a release switch 4, a manual rewind switch 5, pull-up resistors 6 to 10, and an AND gate 11 for producing an output signal of high level when the film and back cover switches 1 and 2 both are off. FIG. 1 also depicts a NAND gate 12, a latch circuit comprised of NAND gates 13 and 14 for memorizing the fact that the blank film advance is complete, a 4-input AND gate 15, and a blank film advance circuit 16 responsive to changes in the output of the AND gate 15 to a high level for causing the film to advance, for example, four frames so that the light struck area of the film is just moved away from the exposure aperture. Also shown in FIG. 1 are inverters 17 to 20, an exposure control circuit 21 of known construction, a wind-up circuit 22, an inverter 23, a NAND gate 24, and a second latch circuit comprised of NAND gates 25 and 26. FIG. 1 also shows an OR gate 30, a rewind circuit 31, a NOR gate 32, and an initial state setting circuit 33 responsive to an electrical power source for producing a pulse of short duration. FIG. 1 also depicts a one-shot circuit 34 responsive to changes in the output of the exposure control circuit 21 to a high level for producing one pulse, an oscillator circuit 35, and a counter 36 receptive of clock pulses from the oscillator circuit 35 for changing its output at the terminal Q when the number of clock pulses counted from the moment at which the one-shot circuit 34 has produced the pulse reaches a prescribed value (corresponding to the time necessary to advance the film through the length of one frame). Finally, FIG. 1 shows an inverter 37, a counter 38 for counting the number of cycles of on-and-off operation of the sprocket switch 3, and an AND gate 39.

The operation of the circuit of such construction is as follows: When the electrical power source is applied, the initial state setting circuit 33 produces an output signal of high level for a very short time which is applied through the NOR gate 32 to the first and second latch circuits. Responsive to this, the first latch circuit comprised of the NAND gates 13, 14 and the second latch circuit comprised of the NAND gates 25, 26 change their outputs to high and low levels respectively. Since, at this time, the manual rewind switch 5 remains off, the output of the inverter 20 remains at a low level, so that the output of the OR gate 30 is low level and the output of the inverter 17 is high level. Then, after the back cover has been opened to insert the film cartridge into the chamber and then closed, the film switch 1 and the back cover switch 2 turn off, causing a change of the output of the AND gate 11 to high level. Although this changes the output of the inverter 37 to low level, the output Q of the counter 38 is left unchanged from low level. Therefore, the output of the inverter 18 remains at a high level.

Hence, such a change of the output of the AND gate 11 to high level causes a change of the output of the AND gate 15 to high level, actuating the blank film advance circuit 16. Thus, the film starts to move for blank frames. When the number of advanced blank frames reaches, for example, four, the counter 38 changes its output Q to high level, and the output of the inverter 18 is inverted to low level, causing a change of the output of the AND gate 15 to a low level. Thus, the above-described blank film advancing operation terminates. At the same time, the AND gate 39 is gated off. Therefore, no more pulses from the sprocket switch 3 enter the counter 38.

Such a change of the output Q of the counter 38 also causes a change in the output of the NAND gate 12 to low level by which the latch output of the NAND gates 13 and 14 becomes low level. Thus, the completion of the blank film advance cycle is memorized in the first latch circuit comprised of the NAND gates 13 and 14.

The photographer will then push a release button (not shown) to turn on the release switch 4, thereby the output of the inverter 19 is changed to high level. As the exposure control circuit 21 is rendered operative, an exposure operation for the film is initiated. After that, when the exposure operation terminates, the exposure control circuit 21 produces an output signal of high level. This signal actuates the wind-up circuit 22 so that the film advances one frame. When one cycle of film winding operation is complete, the wind-up circuit 22 produces an output signal of high level. Therefore, the inverter 23 changes its output to low level.

As all the film has been exposed, when the film is tensioned during the winding operation, the frequency divider 36 is allowed to change its output Q to high level. Since the output of the inverter 23 is high level, the NAND gate 24 then changes its output to low level. Responsive to this, the latch circuit comprised of the NAND gates 25 and 26 changes its output to high level, and, therefore, the OR gate 30 also changes its output to high level, actuating the rewind circuit 31. Thus, the film starts to be rewound. When all the film has been rewound, the rewind circuit 31 changes its output to high level, thereby both latch circuits comprised of the NAND gates 13 add 14, and 25 and 26 are reset to their initial states through the NOR gate 32.

Now, assume that the back cover is accidentally opened and closed after the end of the blank film advance. When the back cover is opened, the back cover switch 2 turns on, causing the output of the AND gate 11 to change to low level, and the output of the inverter 37 to high level. As the counter 38 is then reset, therefore, its Q output becomes low level and the output of the inverter 18 becomes high level again. But, despite the fact that the back cover is then closed to change the output of the AND gate 11 to high level again (because, as has been described above, the fact that the first cycle of blank film advance has been effected is stored in the memory means in the form of the latch circuit comprised of the NAND gates 13 and 14, that is, the output of this latch circuit is maintained at low level), the output of the AND gate 15 is prohibited from becoming high level. Hence, accidental recycling of opening and closing of the back cover never results in the performance of a next or second cycle of blank film advance.

The resetting of the latch circuit comprised of the NAND gates 13, 14 is carried out in automatic response to the start of the rewind operation as has been described above. It is also possible to start the rewind operation before the film is tensioned. For this purpose, the photographer will turn on the manual rewind switch 5.

Though, in the foregoing illustrated embodiment, the sprocket switch 3 responsible for movement of the film is employed to detect when the last blank frame of film has been fed in order to obtain the signal representing the end of each cycle of blank film advance, it may be otherwise obtained by using a mechanical switch arranged to be actuated in response to feeding of the last blank frame.

According to the present invention, as has been described above, the fact that the first cycle of blank film advance is complete is memorized, and the coordination of the memory with the back cover is controlled in such a manner that even when the opening and closing of the back cover is recycled by mischance, a second cycle of blank frame advance of the same film is prohibited. Therefore, that portion of the film which would otherwise be made useless by one or more subsequent cycle or cycles of blank film advance can be saved. Another advantage is that if the reopening of the back cover occurs at a time near the end of the film (for example, three or less frames are left unexposed), the present invention avoids the problem where the film is tensioned before the end of that cycle of advance of the four blank frames, the blank film advancing operation never comes to the end, in some cases, leaving the current supply to the motor for feeding the film to continue. Thus, not only the battery, but also the motor can be protected from damage.

Figure 2:
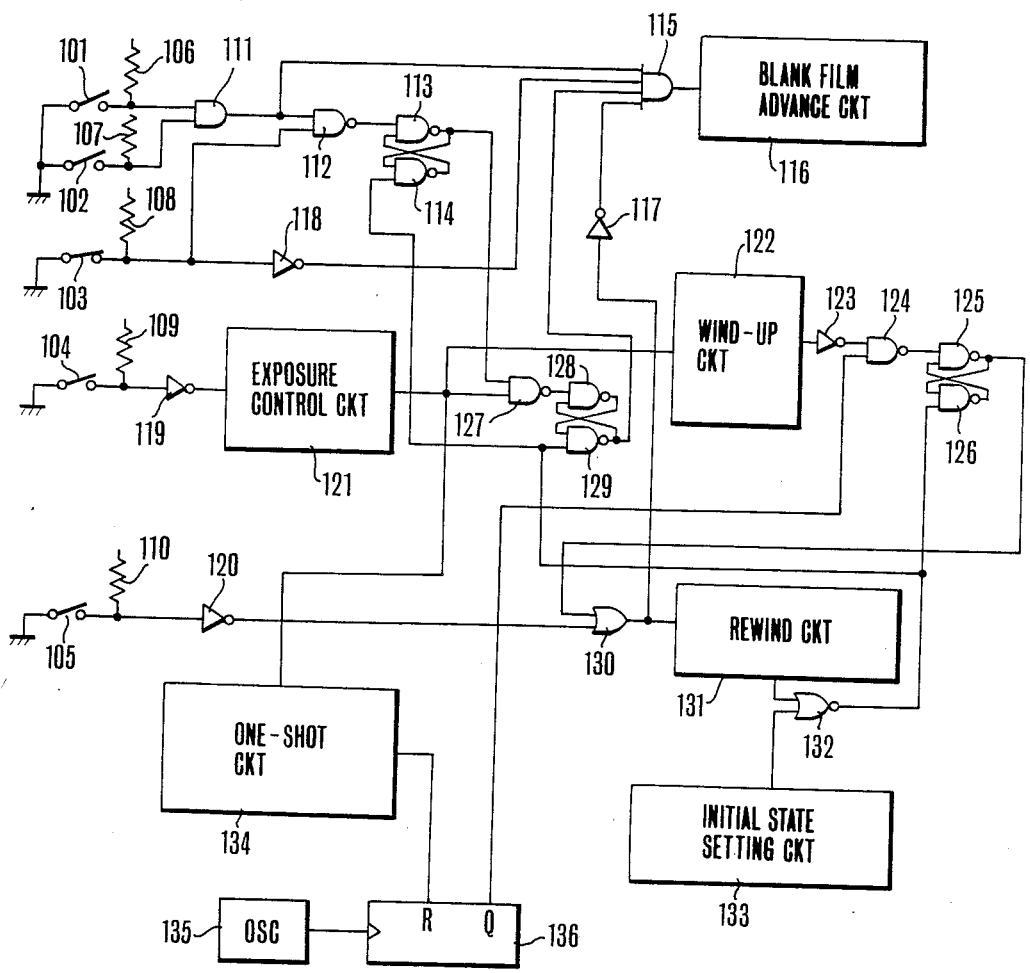
FIG. 2 is an electrical circuit diagram, partly in block form, of a second embodiment of the blank film advance control device for a camera according to the present invention.

FIG. 2 shows the circuitry of a second embodiment of the blank film advance control device for camera according to the present invention. This embodiment is different from the above-described FIG. 1 embodiment in that the completion of the blank film advance cycle is memorized by the "and" condition that the blank film advance has been complete and at least one cycle of photographic operation has been carried out. In FIG. 2, the circuit comprises a film switch 101 arranged to turn off when a film cartridge is inserted into and seated in the chamber, a back cover switch 102 arranged to turn off when the back cover is closed, a blank advance switch 103 arranged to turn on when the back cover is closed and to turn off when the blank film advance cycle is complete, a release switch 104, a manual rewind switch 105, pull-up resistors 106 to 110, and an AND gate 111 having two inputs connected to the respective outputs of the switches 101 and 102. FIG. 2 also depicts a NAND gate 112, a latch circuit comprised of NAND gates 113 and 114 for memorizing the fact that the blank film advance cycle is complete, a 4-input AND gate 115, and a blank film advance circuit 116 responsive to a signal of high level for advancing the film by, for example, four frames to move the light-struck area of the film away from the exposure aperture. Also shown in FIG. 2 are inverters 117 to 120, an exposure control circuit 121 of known construction, a wind-up circuit 122, an inverter 123, a NAND gate 124, and a second latch circuit comprised of NAND gates 125 and 126. FIG. 2 also shows a NAND gate 127, a third latch circuit comprised of NAND gates 128 and 129 for memorizing the fact that at least one frame is exposed, an OR gate 130, a rewind circuit 131, a NOR gate 132, and an initial state setting circuit 133 responsive to closure of a power switch (not shown) for producing an output signal of high level for a very short time. Also shown in FIG. 2 are a one-shot circuit 134 responsive to a signal of high level from the exposure control circuit 121 for producing one pulse, an oscillator circuit 135, and a counter 136 for counting the clock pulses from the oscillator circuit 135 upon attainment of the number of clock pulses counted from the moment at which it has been reset by the pulse from the one-shot circuit 134 to a prescribed value (corresponding to the time necessary to advance the film through the length of one frame) to produce a signal of high level at its output terminal Q.

The operation of the circuit of such construction is as follows: When the electrical power source is thrown, the initial state setting circuit 133 produces a signal of high level for a very short time which is applied through the NOR gate 132 to the latch circuit comprised of the NAND gates 128 and 129, thereby the output of the latch circuit is changed to high level. Also, the output of the latch circuit comprised of the NAND gates 125 and 126 is changed to low level. Since, at this time, the manual rewind switch 105 remains off, the output of the inverter 120 is a signal of low level. Therefore, the output of the OR gate 130 becomes a signal of low level, and the output of the inverter 117 becomes a signal of high level. Also, the back cover is opened, the film cartridge is loaded into the chamber (not shown), and the back cover is closed, thereby the film switch 101 and the back cover switch 102 are turned off to change the output of the AND gate 111 to high level. Further, since, at this time, the blank film advance switch 103 is on, the output of the inverter 118 is of high level. From the foregoing, it results that the output of the AND gate 115 becomes a signal of high level. Responsive to this, the blank film advance circuit 116 operates. Hence, a blank advancing operation of the film is initiated. And, when the blank film advance of, for example, 4 frames of film terminates, the blank advance switch 103 turns off, and the output of the inverter 118 inverts to a signal of low level, so that the output of the AND gate 115 becomes a low level signal. Therefore, the above-described blank film advancing operation stops. Also, by the blank film advance switch 103 turning off, the output of the NAND gate 113 becomes a signal of low level, and the latch output by the NAND gates 113 and 114 is left to be a signal of high level. Thus, the completion of the blank film advance is memorized by the latch circuit comprised of the NAND gates 113 and 114.

Next, when a release operation is performed by the photographer to turn on the release switch 104, the output of the inverter 119 becomes a signal of high level, and the exposure control circuit 121 operates, thereby an exposure operation to the film is started. After that, when the exposure operation terminates and a signal of high level is produced from the exposure control circuit 121, the output of the NAND gate 127 becomes a signal of low level, and the latch output by the NAND gates 128 and 129 becomes a signal of low level. That is, the fact that at least one shot has been taken after the end of the blank film advance is now memorized by the latch circuit comprised of the NAND gates 128 and 129. Also, when the signal of high level is produced from the exposure control circuit 121 as has been described above, the wind-up circuit 122 is actuated to wind up the film by one frame. When the winding-up is complete, a signal of high level is produced from the wind-up circuit 122, and the output of the inverter 123 inverts to a signal of low level.

Here, as the winding-up time increases due to the tensioning of the film, when a signal of high level is produced from the frequency divider circuit 136 during the time for which the output of the inverter 123 is the signal of high level, the output of the NAND gate 124 becomes a signal of low level, and the latch output by the NAND gates 125 and 126 becomes a signal of high level. Therefore, the output of the OR gate 130 also becomes a signal of high level, and the rewind circuit 131 is actuated. Hence, the film starts to be rewound. When the rewinding is complete, a signal of high level is produced from the rewind circuit 131, being applied through the NOR gate 132 to the latch circuits of the NAND gates 125, 126, 128, 129 and 113, 114. Thus, the latch outputs are returned to the initial state.

Described below is the a case where after the blank film advancing operation is terminated and at least one frame of film has been exposed, the back cover is opened and closed. Becoming aware of the back cover being opened by mischance, the photographer closes it again. Then, as has been described above, the blank film advance switch 103 turns on, and the output of the inverter 118 becomes the signal of high level. Yet, as has been described above, the fact that after the blank film advance was complete, the camera has been shot at least once is memorized in the latch circuit comprised of the NAND gates 128 and 129. In other words, the latch output by the NAND gates 128 and 129 is held to the signal of low level, so that the output of the AND gate 115 does not become the signal of high level. Thus, even if such an accident occurs, the blank film advance does not take place again.

Figure 3:
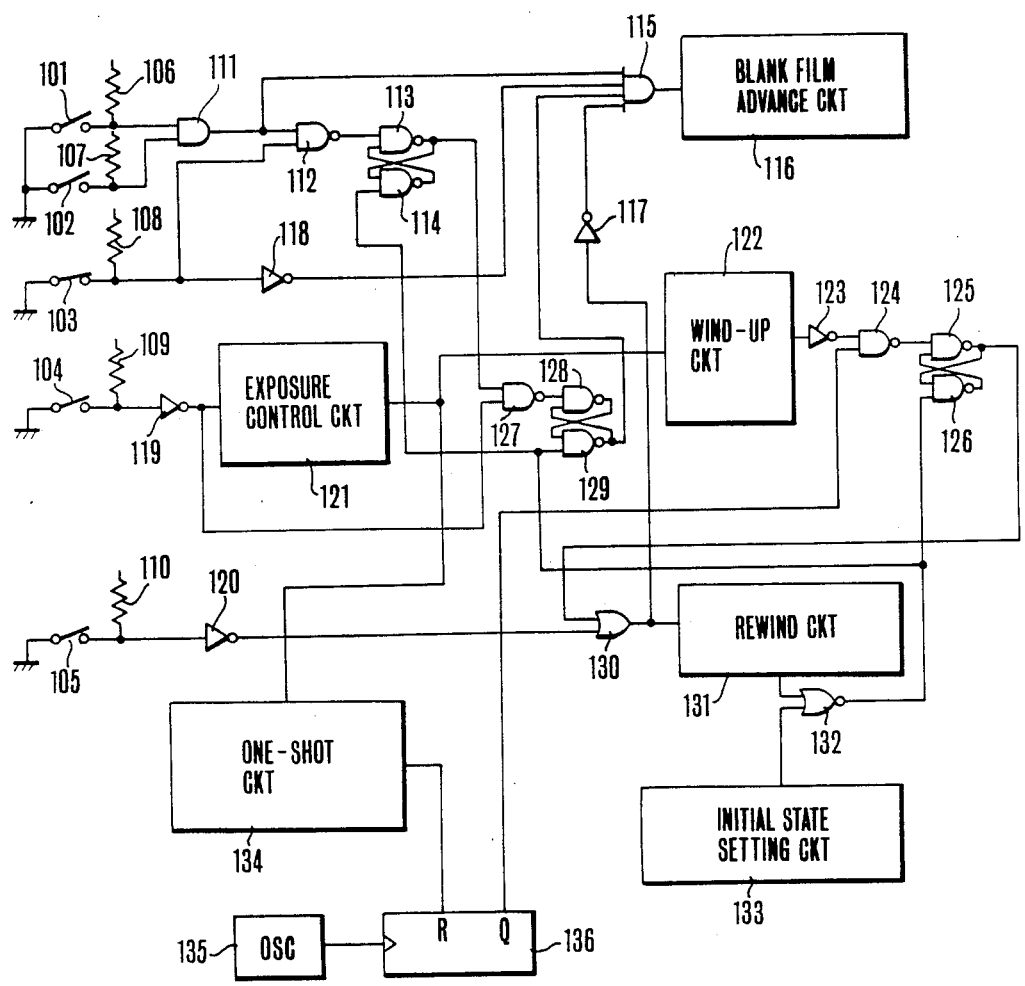
FIG. 3 is an electrical circuit diagram, partly in block form, of a third embodiment of the blank film advance control device for a camera according to the present invention.

FIG. 3 shows a third embodiment of the blank film advance control device for a camera according to the present invention which differs from the FIG. 2 embodiment in that the signal to be applied to one of the input terminals of the NAND gate 127 is not the output of the exposure control circuit 121, but the output signal of the inverter 119. Thereby, the mere release suffices for putting the fact that at least one frame has been exposed into the memory of the NAND gates 128 and 129.

In each of the embodiments of FIGS. 2 and 3, a blank advance switch 103 of a mechanical form is used for obtaining the signal representing the completion of the blank film advance. This signal may otherwise be obtained by counting the number of advanced frames with the use of signals from the sprocket responsible for motion of the film. For this case, the resetting may be performed by utilizing the opening of the back cover.

According to the embodiments of FIGS. 2 and 3, in the case where the camera is shot at least once (this number may be set at a desired value as the necessity arises) after the completion of the blank film advance, this fact is memorized. Even when the back cover is later opened and closed by mischance, because the blank film advance is prevented from being recycled by taking one shot, there is no possibility of letting even that portion of the fresh area of the film which can be usable for making exposures go off in vain as the blank film advance is carried out again. Therefore, the film is not wastefully used. Also, if the opening of the back cover by mischance occurs near the end of the film (for example, three or less frames left, the use of the prior art device would result in never completing blank film advance because the film is tensioned before the prescribed number of blank frames are advanced. In some conventional cameras, therefore, the current supply to the film feeding motor would be left to continue. This would have a bad influence on not only the motor, but also on the electrical power source. The present invention has eliminated such problems.

Figure 4:
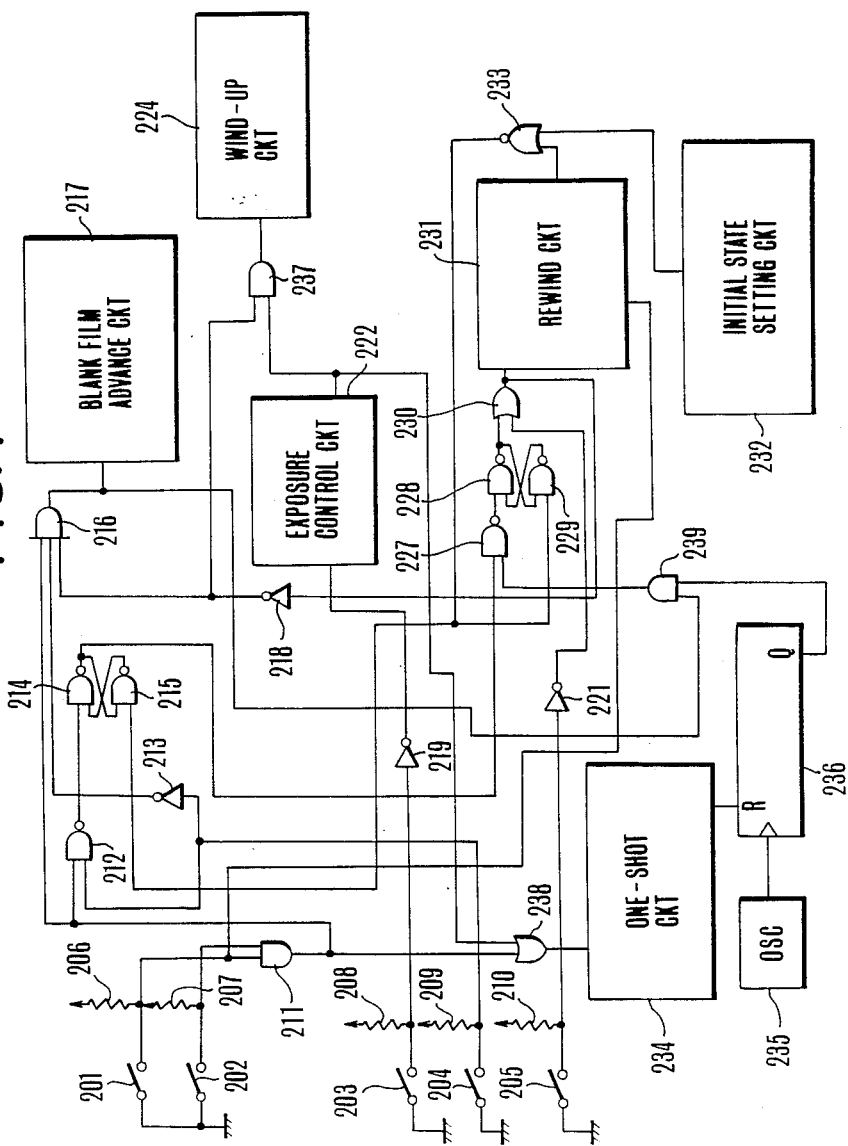
FIG. 4 is an electrical circuit diagram, partly in block form, of a fourth embodiment of the blank film advance control device for a camera according to the present invention.

FIG. 4 shows the circuitry of a fourth embodiment of the blank film advance control device for a camera according to the present invention. In FIG. 4, the circuit comprises a film switch 201 arranged to turn off when a film cartridge is inserted into and seated in the chamber, a back cover switch 202 arranged to turn off when the back cover is closed, a release switch 203, and a blank film advance switch 204 arranged to turn on when the back cover is closed and to turn off when the blank film advance cycle is complete. FIG. 4 also depicts a manual rewind switch 205, pull-up resistors 206 to 210, and an AND gate 211 for producing an output signal of high level when the film switch 201 and the back cover switch 202 turn off. Also shown in FIG. 4 are a NAND gate 212, an inverter 213, a latch circuit comprised of NAND gates 214 and 215 for memorizing the fact that the blank film advance cycle is complete, a 3-input AND gate 216, and a blank film advance circuit 217 responsive to a signal of high level at its input for advancing the film by, for example, four frames to move the light-struck area of the film away from the film gate. FIG. 4 also depicts inverters 218, 219, 221, an exposure control circuit 222 of known construction, a wind-up circuit 224, a NAND gate 227, NAND gates 228 and 229 constituting a latch circuit, an OR gate 230, a rewind circuit 231, and an initial state setting circuit 232 responsive to closure of a power switch for producing an output signal of high level for a very short time. Also depicted in FIG. 4 are a NOR gate 233, a one-shot circuit 234 for producing an output signal in the form of one pulse, an oscillator circuit 235, and a counter 236 for counting clock pulses from the oscillator circuit 235 upon attainment of the number of pulses counted from the moment at which it has been reset by the pulse signal from the one-shot circuit 234 to a prescribed value (corresponding to the time necessary to advance the film four frames) to produce a signal of high level at its output terminal Q. Finally, FIG. 4 shows AND gates 237 and 239, and an OR gate 238.

Figure 5:
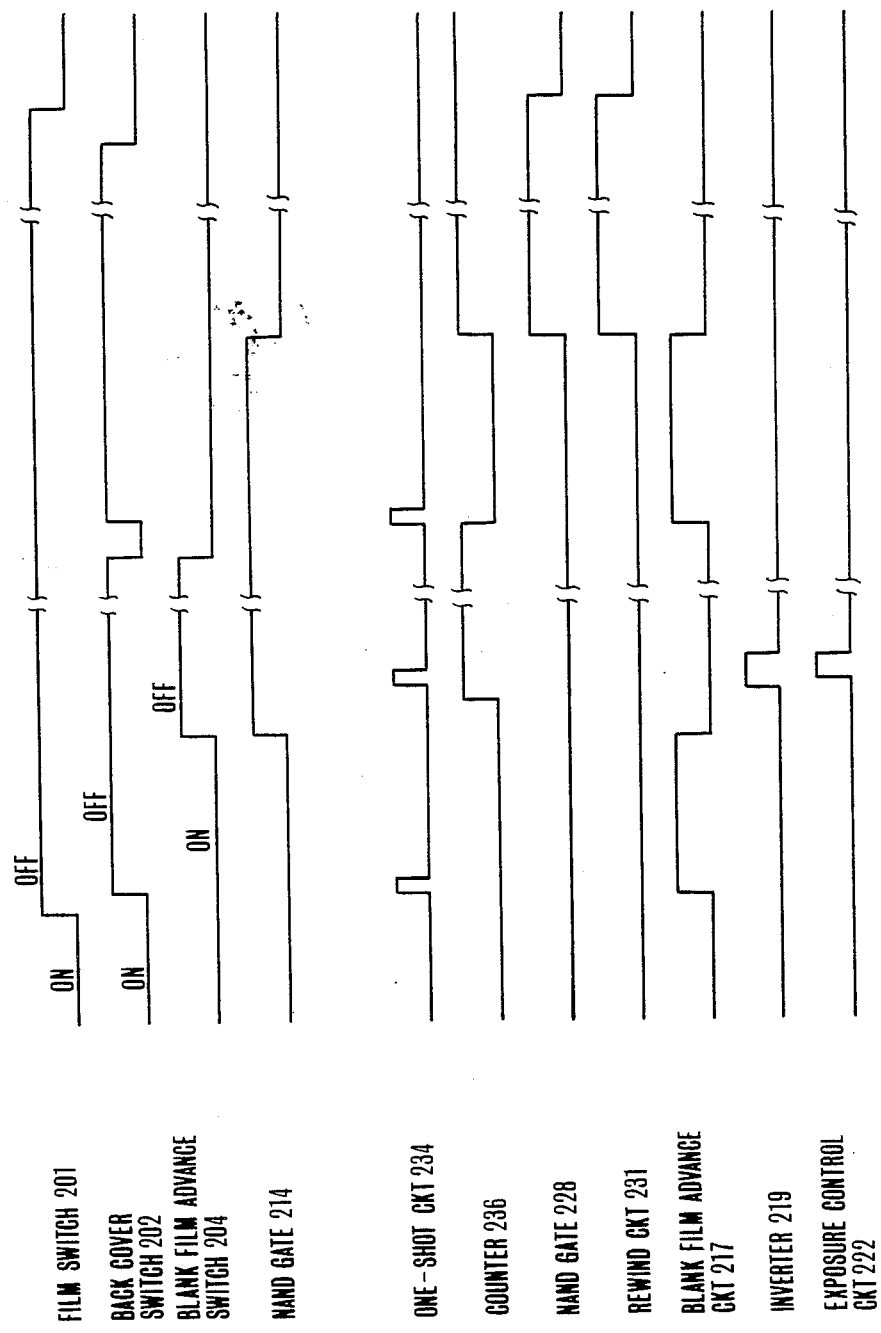
FIG. 5 is a pulse timing chart illustrating a manner in which the circuit of FIG. 4 operates.

Next, an explanation will be provided of the operation of the FIG. 4 circuit by reference to the pulse timing chart of FIG. 5. With the back cover opened, when the film cartridge is inserted into the chamber, the film switch 201 is turned off. Then, when the back cover is closed, the switch 202 is turned off. Therefore, the output of the AND gate 211 becomes a signal of high level. Also, since the blank film advance switch 204 is off, the output of the inverter 213 is of high level. Further, since, at this time, the rewind circuit 231 is not actuated, or the output of the OR gate 230 is a signal of low level, the output of the inverter 218 is of high level. For the above reason, the output of the AND gate 216 becomes a signal of high level, actuating the blank film advance circuit 217. Hence, a blank frame advancing operation of the film is initiated. When the blank film advance cycle of, for example, four frames, is complete, the switch 204 turns off, inverting the output of the inverter 213 to a signal of low level. Thus, the above-described blank film advancing operation is terminated. Also, by the blank film advance switch 204 turning off, the output of the NAND gate 212 becomes a signal of low level, and the latch output by the NAND gates 214 and 215 becomes a signal of high level (see FIG. 5). Thus, the completion of the blank film advance is memorized in the latch circuit comprised of the NAND gates 214 and 215.

Next, when the photographer actuates a camera release, the switch 203 is turned on. Then, the output of the inverter 219 becomes a signal of high level, actuating the exposure control circuit 222. Hence, an exposure operation for the first frame of film is started. At the termination of the exposure time, the exposure control circuit 222 produces an output signal of high level. Responsive to this, the output of the AND gate 237 becomes a signal of high level, actuating the wind-up circuit 224 to wind up the film by one frame.

Next, an explanation will be provided regarding the case where the back cover is opened and closed at a tie when the number of film frames left usable for exposure is, for example, only three. When the back cover is opened by mischance, the back cover switch 202 turns on, and a signal of low level appears at the junction with the pull-up resistor 207. In addition, the blank film advance switch 204 also turns on, so that a signal of low level appears at the junction with the pull-up resistor 209 (see FIG. 5). After becoming aware of having made a faulty operation of opening the back cover, the photographer will close the back cover again. Then, as has been described above, the AND gate 216 changes its output to high level, actuating the blank film advance circuit 217. Hence, the second cycle of blank film advance is started. Such re-opening of the back cover also causes the output of the AND gate 211 to change from low to high level. Responsive to this, the one-shot circuit 234 produces a second pulse by which the counter 236 is reset and starts to count new clock pulses from the oscillator circuit 235 (see FIG. 5).

The above-described counter 236 is so designed that after the prescribed time (after the corresponding number of clock pulses necessary to advance the film at the normal speed by four frames), it produces a signal of high level at its Q output terminal. In the case when the blank film advance is normally performed, the blank film advance is complete before the output of the counter 236 becomes high level. Therefore, the output of the AND gate 216 remains low level, the output of the AND gate 239 is low level, and the output of the NAND gate 227 is high level. Therefore, the latch output of the NAND gates 228 and 229 is left unchanged from low level, and the output of the OR gate 230 also is left unchanged from low level. Hence, the rewind circuit 231 is not actuated. But when the above-described mischance has occurred at a time near the end of the film, the second cycle of blank film advance cannot fully be performed. While the second cycle of blank film advance is incomplete, therefore, the output of the aforesaid counter 236 becomes high level. Then the output of the AND gate 239 also becomes high level. Despite the fact that the output of the NAND gate 214 is latched to high level, the output of the NAND gate 227 becomes low level, and the latch output of the NAND gates 228 and 229 is caused to become a signal of high level. Then, the output of the OR gate 230 also becomes a signal high level. Thereby the rewind circuit 231 is actuated, and the film starts to be rewound (see FIG. 5). For this time, because the output of the inverter 218 becomes the signal of low level, the output of the AND gate 216 becomes low level, not actuating the blank film advance circuit 217. It should be pointed out here that both the blank film advance circuit 217 and the rewind circuit 231 are not actuated at the same time.

When all the film has been rewound, the rewind circuit 231 produces an output signal of high level. Responsive to this signal, the NOR gate 233 changes its output to low level, resetting the latch circuits comprised of the NAND gates 214, 215, and 228, 229, or returning the latch outputs to the initial state (the signal of low level). The rewind circuit 231 can be manually actuated by the switch 205. If it is turned on, the same rewinding operation as the above can be carried out.

In the above-described embodiments, the camera may be provided with an additional capability of generating and displaying an alarm when the blank film advance has not normally been performed. This additional capability may be realized by automatic means making it possible to discriminate which cycle (the first or the second) of blank film advance has failed to present a display, upon determination of the occurrence of the failure in the first cycle, or to only rewind the film upon determination of the occurrence of the failure in the second cycle but present no display.

Figure 6:
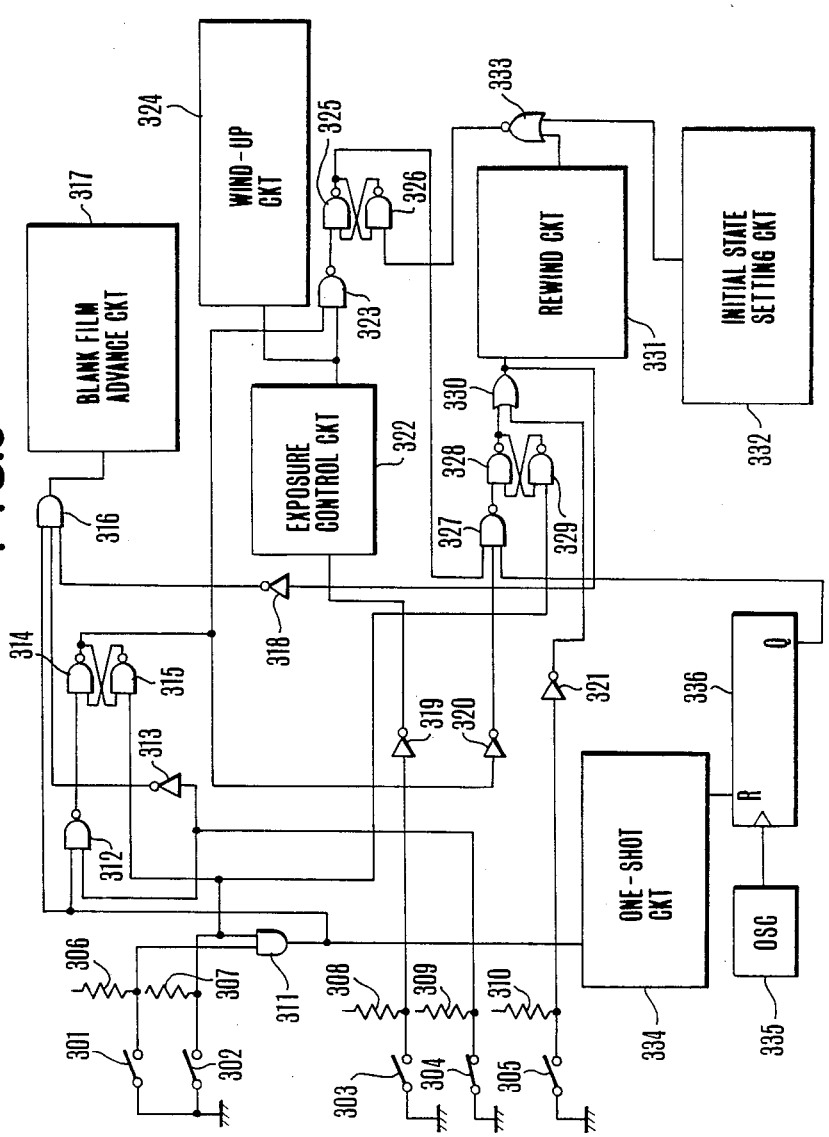
FIG. 6 is an electrical circuit diagram, partly in block form, of a fifth embodiment of the blank film advance control device for a camera according to the present invention.

FIG. 6 shows the circuitry of a fifth embodiment of the blank film advance control device for a camera according to the present invention which is different from the above-described embodiment of FIG. 4 in that the completion of blank film advance is memorized when an "and" condition is established that the blank film advance was complete and at least one cycle of photographic operation has been performed. In FIG. 6, the circuit comprises a film switch 301 arranged to turn off when the film cartridge is inserted into and seated in the chamber, a back cover switch 302 arranged o turn off when the back cover is closed, a release switch 303, and a blank film advance switch 304 arranged to turn on when the back cover is closed, and to turn off when the blank film advance is complete. FIG. 6 also depicts a manual rewind switch 305, pull-up resistors 306 to 310, an AND gate 311 for producing an output signal of high level when the film switch 301 and the back cover switch 302 are turned off, a NAND gate 312, an inverter 313, and NAND gates 314 and 315 comprising a latch circuit for memorizing the fact that the blank film advance is complete. Also shown in FIG. 6 are a 3-input AND gate 316, a blank film advance circuit 317 responsive to a signal of high level at its input for advancing the film by, for example, four frames in blank to move the light-struck area of the film away from the film gate, inverters 318 to 321, an exposure control circuit 322 of known construction, a NAND gate 323, a wind-up circuit 324, and NAND gates 325 and 326 comprising a latch circuit for memorizing the fact that at least one cycle of photographic operation has been performed. FIG. 6 also shows a NAND gate 327, NAND gates 328, 329 comprising a latch circuit, an OR gate 330, a rewind circuit 331, and an initial state setting circuit 332 responsive to closure of a power switch for producing an output signal of high level for a very short time. Finally, FIG. 6 shows a NOR gate 333, a one-shot circuit 334 for producing an output signal in the form of one pulse, an oscillator circuit 335, and a counter 336 for counting clock pulses from the oscillator circuit 335 upon attainment of the number of clock pulses counted from the moment at which it is reset by the pulse signal from the one-shot circuit 334 to a prescribed value (corresponding to the time necessary to feed four frames of film) to produce an output signal of high level at its terminal Q.

Figure 7:
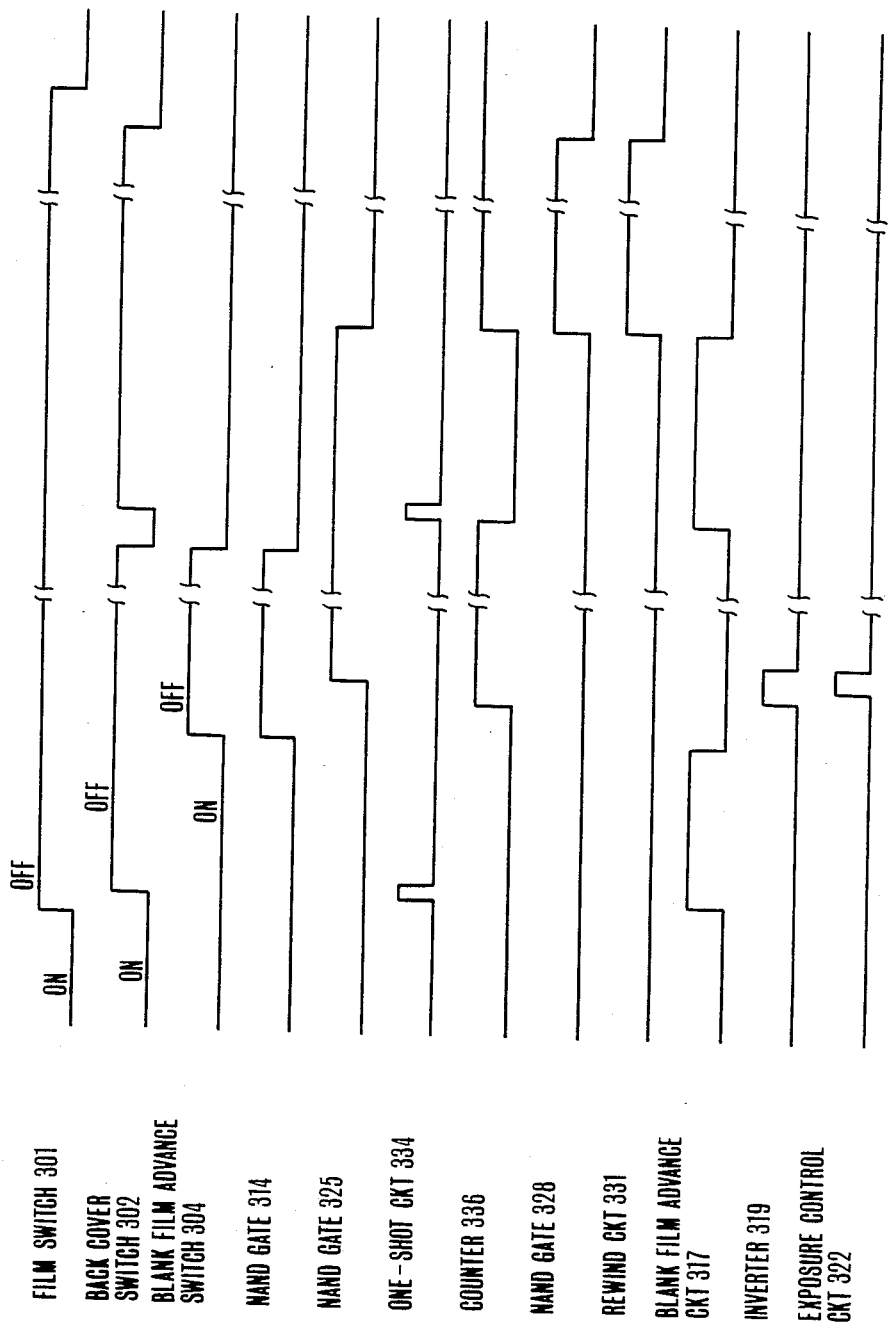
FIG. 7 is a pulse timing chart illustrating a manner in which the circuit of FIG. 6 operates.

Next, an explanation will be given of the operation of the FIG. 6 circuit by reference to the timing chart of FIG. 7. With the back cover opened, when the film cartridge is inserted in the chamber, the film switch 301 is turned off. Then, when the back cover is closed, the switch 302 is turned off, causing the output of the AND gate 311 to change to high level (see FIG. 7). Also, since the blank film advance switch 304 is on, the output of the inverter 313 is high level. Further, since, at this time, the rewind circuit 331 is not activated, or the output of the OR gate 330 is low level, the output of the inverter 318 is high level. For the above reason, the output of the AND gate 316 becomes high level, actuating the blank film advance circuit 317. Hence, the blank film advance is started. And, when the blank film advance of, for example, four frames, ends, the blank film advance switch 304 turns off, changing the output of the inverter 313 to low level, and the output of the AND gate 316 to low level. Thus, the above-described blank film advancing operation is terminated. Such turning-off of the blank film advance switch 304 also causes the output of the NAND gate 312 to change to low level, which in turn causes the output of the latch circuit comprised of the NAND gates 314 and 315 to become high level (see FIG. 7). Thus, the completion of the blank film advance is memorized in the latch circuit comprised of the NAND gates 314 and 315.

Next, when the photographer actuates a camera release, the release switch 303 turns on, thereby the output of the inverter 319 is changed to high level to actuate the exposure control circuit 322. Hence, an exposure operation of the first frame of film is initiated. At the termination of duration of the exposure time, the exposure control circuit 322 produces an output signal of high level. Responsive to this, the NAND gate 323 changes its output to low level, thereby the output of the latch circuit comprised of the NAND gates 325 and 326 is changed to high level (see FIG. 7). This circuit has so far been reset by the signal of high level produced from the initial state setting circuit 332 from the time when the electrical power source was thrown. Thus, the fact that the camera has been shot once after the completion of the first cycle of blank film advance is memorized in the latch circuit comprised of the NAND gates 325 and 326. Also, when the signal of high level is produced from the exposure control circuit 322, as has been described above, the wind-up circuit 324 is actuated to advance the film one frame.

Next, an explanation will be given of the case where the back cover is opened and closed at a time when the remaining number of frames of film usable for exposures is, for example, only three. When the back cover is opened by mischance, the back cover switch 302 turns on, and a signal of low level appears at the junction of it and the pull-up resistor 307. Therefore, the outputs of the latch circuits comprised of the NAND gates 314, 315 and 328, 329 become low level. Also the blank film advance switch 304 turns on. Therefore, the potential at the junction of it and the pull-up resistor 309 drops to low level (see FIG. 7). After that, becoming aware of faulty operation of having opened the back cover, the photographer will close the back cover again. Responsive to this, the output of the AND gate 316 changes to high level, as has been described above, actuating the blank film advance circuit 317. Hence, the second cycle of blank film advance of, for example, four frames of film is started. At the same time, the output of the AND gate 311 changes from low to high level. Responsive to this, the one-shot circuit 334 produces a pulse, thereby the counter 336 is reset. It then starts to count clock pulses from the oscillator circuit 335 (see FIG. 7).

By the way, because the above-described counter 336 produces an output signal of high level at its terminal Q in a prescribed time (after the corresponding number of clock pulses necessary to feed four frames of film at the constant speed), it is the normal case that before the output of the counter 336 changes to high level, one cycle of blank film advance terminates and the output of the NAND gate 314 changes to high level, or the output of the inverter 320 changes to low level, and therefore the output of the latch circuit comprised of NAND gates 328, 329 remains low level, and the output of the OR gate 330 also remains low level, not actuating the rewind circuit 331. For the above-described accidental case where the back cover is opened at a time near the end of film, however, because the four frames of film cannot be pulled out from the cartridge, the only changed input of the NAND gate 327 is the output of the counter 336 (to high level). Therefore, the output of the latch circuit comprised of the NAND gates 328 and 329 becomes high level and the output of the OR gate 330 also becomes high level. Hence, the rewind circuit 331 is actuated, and the film starts to be rewound (see FIG. 7). For this time, the output of the inverter 318 is low level. Therefore, the output of the AND gate 315 is low level. Thus, the blank film advance circuit 317 does not operate. That is, the blank film advance and the rewind are never activated at the same time.

When all film has been rewound, the rewind circuit 331 produces an output signal of high level, and the output of the NOR gate 333 becomes low level, thereby the latch circuit comprised of the NAND gates 325 and 326 is reset, that is, the latch output is returned to the initial state (signal of low level). The rewind circuit 331 can otherwise be actuated by turning on the manual rewind switch 305.

Figure 8:
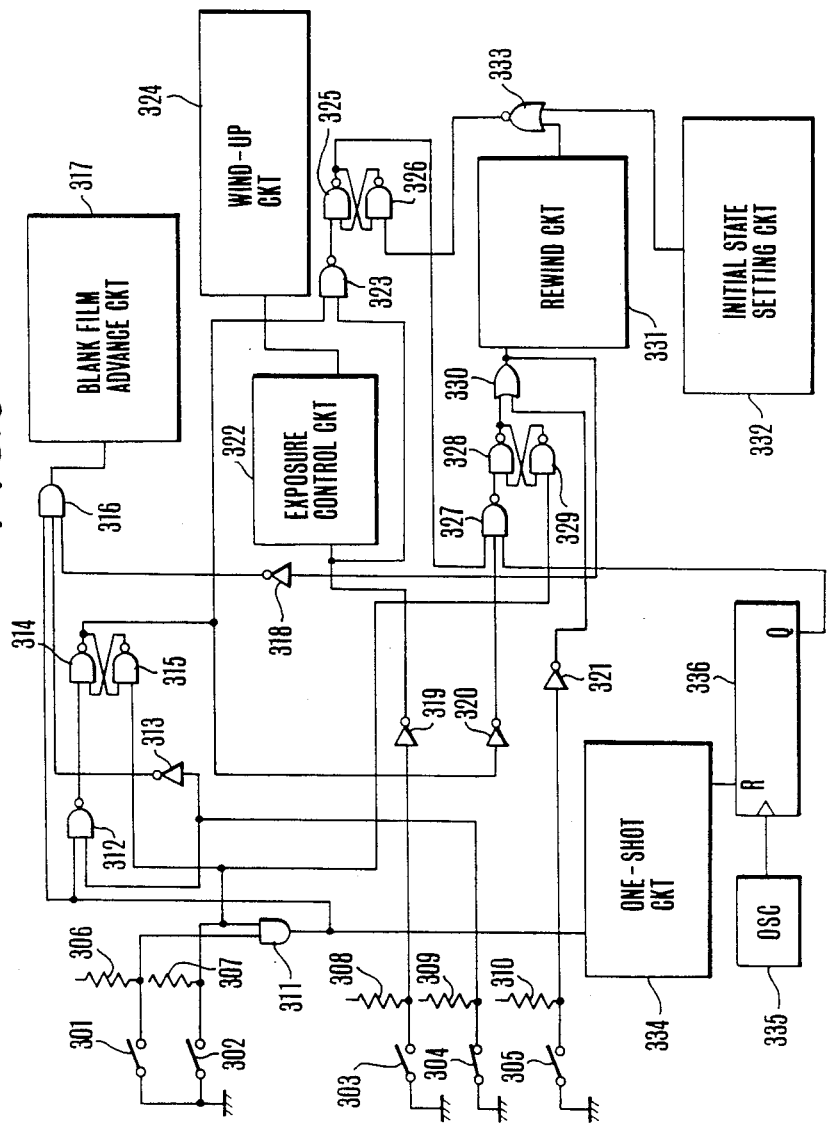
FIG. 8 is an electrical circuit diagram, partly in block form, of a sixth embodiment of the blank film advance control device for a camera according to the present invention.

FIG. 8 shows a sixth embodiment of the blank film advance control device for a camera according to the present invention which is different from the FIG. 6 embodiment in that the signal to be applied to one of the inputs of the NAND gate 323 is not the output of the exposure control circuit 322, but the output signal of the inverter 319. Thereby the mere release actuation suffices for the NAND gates 328 and 329 to memorize that fact that the camera has been shot once or more.

According to the FIGS. 6 and 8 embodiments, when at least one shot (the number of shots is not limited to one, but may be determined according to necessity to be two or more) has been taken after the completion of the first cycle of blank film advance, this is memorized in order to insure that despite the second cycle of blank film advance initiated in response to opening and closing of the back cover by mischance, if this cycle will fail ending, the rewinding operation is automatically started. This enables the photographer to be freed from the troublesome and time-consuming problems of examining whether or not the blank film advance has been normally performed, and, if so, must rewind the film by hand, or manipulate the manual rewind switch 305.

Also, in application of the invention to a camera having the capability of displaying and alarming the failure of the normal blank film advance, if the camera is provided with an additional capability of automatically discriminating between the failure of the first cycle of blank film advance or automatic loading and tensioning of the film during the second cycle of blank film advance so that when the failure is determined to have occurred in the first cycle, a display represents that the film has not advanced the prescribed number of blank frames, and when in the second cycle, no display is made but automatic rewind is performed. By this, an advance in the automation of cameras can be achieved.

Further, although all the foregoing illustrated embodiments have been described as applied to cameras of the type in which as the number of exposed frames increases, the film is being pulled out of the cartridge, it is to be understood that the present invention is not confined thereto. In application to another type of camera where after all film has been transported to the takeup spool, the exposed area of the film is pulled into the cartridge, or the so-called pre-winding type, this pre-winding should be taken to correspond to the blank film advance of the above-described embodiments of the invention.

What is claimed is:

1. A film blank advance control device for a camera having a cover for use in loading a film in the camera, wherein the camera is adapted, upon closure of the cover, to automatically advance the film to a prescribed position during a first cycle of film blank advance, and wherein the camera is also adapted, upon opening/closing the cover again after completion of the first cycle of said film blank advance, to automatically further advance the film during a second cycle of film blank advance, and wherein said device comprises:

memory means for storing data representing the completion of the first cycle of said film blank advance; and means for indicating that the film is rewound in response to the storing of the data in the memory means representing the completion of the first cycle of said film blank advance and stopping of the advancing of the film before the completion of the second cycle of said film blank advance when the cover is opened and closed again after completion of the first cycle of said film blank advance.

2. A film blank advance control device for a camera having a cover for use in loading a film in the camera, wherein the camera is adapted, upon closure of the cover, to automatically advance the film to a prescribed position during a first cycle of film blank advance and to rewind the film in a rewind mode, wherein the camera is also adapted, upon opening and closing the cover again after completion of the first cycle of said film blank advance, to automatically further advance the film during a second cycle of film blank advance, and wherein said device comprises:

memory means for storing data representing the completion of the first cycle of said film blank advance; and automatic mode selection means for automatically switching the camera to the rewind mode in response to the storing of the data in the memory means and stopping of the advancing of the film during the second cycle of said film blank advance when the cover is opened and closed again after completion of the first cycle of said film blank advance.

3. A camera including a film blank advance control device for the camera having a cover for use in loading a film in the camera and exposure means for performing an exposure operation for exposing the film, wherein the camera is adapted, upon closure of the cover, to automatically advance the film to a prescribed position during a first cycle of film blank advance, wherein the camera is also adapted, upon opening and closing the cover again after completion of the first cycle of said film blank advance, to automatically further advance the film during a second cycle of film blank advance, and wherein said device comprises:

memory means for storing data representing the completion of the first cycle of said film blank advance and the occurrence of the performing of the exposure operation by the camera after completion of the first cycle of said film blank advance; and means for indicating that the film is rewound in response to the storing of the data representing the completion of the first cycle of said film blank advance in said memory means and stopping of the advancing of the film before the completion of the second cycle of said film blank advance and the occurrence of the performing of an exposure operation by the camera in said memory means when the cover is opened and closed again after the completion of the first cycle of said film blank advance.

4. A film blank advance control device for a camera having a cover for use in loading a film in the camera and exposure means for performing an exposure operation for exposing the film, wherein said camera is adapted, upon closure of the cover, to automatically advance the film to a prescribed position during a first cycle of film blank advance and to rewind the film in a rewind mode, wherein the camera is also adapted, upon opening and closing the cover again after completion of the first cycle of said film blank advance, to automatically further advance the film during a second cycle of film blank advance, and wherein said device comprises:

memory means for storing data representing the completion of the first cycle of said film blank advance and the occurrence of the performing of the exposure operation by the camera after the completion of the first cycle of said film blank advance; and automatic mode selection means for automatically switching the camera to the rewind mode in response to the storing of the data representing the completion of the first cycle of said film blank advance and the occurrence of the performing of the exposure operation and stopping of the advancing of the film before the completion of the second cycle of said film blank advance when the cover is opened and closed again after the completion of the first cycle of said film blank advance.

5. A film blank advance control device for use in a camera having a cover for loading a film into the camera, a shutter, and a shutter release, wherein said camera is adapted, upon closure of the cover, to automatically advance the film to a prescribed position during a first cycle of film blank advance, and wherein said camera is also adapted, upon opening and closing the cover again after completion of the first cycle of film blank advance, to automatically further advance the film during a second cycle of film blank advance, wherein said device comprises:

memory means for storing data representing the completion of the first cycle of film blank advance and actuating of the shutter release of the camera after completion of the first cycle of said film blank advance; and means for indicating that the film is rewound in response to the storing of the data representing the completion of the first cycle of said film blank advance and the actuating of the shutter release and stopping of the advancing of the film before completion of the second cycle of said film blank advance when the cover is opened and closed again after the completion of the first cycle of the film blank advance.

6. A film blank advance control device for a camera having a cover for use in loading a film in the camera, a shutter and a shutter release, wherein the camera is adapted, upon closure of the cover, to automatically advance the film to a prescribed position during a first cycle of film blank advance, wherein said camera is also adapted, upon opening and closing the cover again after completion of the first cycle of film blank advance to automatically further advance the film during a second cycle of film blank advance, and wherein said device comprises:
 memory means for storing data representing the completion of the first cycle of film blank advance and the actuating of the shutter release after completion of the first cycle of said film blank advance; and
 automatic mode selection means for automatically switching the camera to a rewind mode in response to the storing of the data representing the completion of the first cycle of said film blank advance and the actuating of the shutter release in said memory means and stopping of the advancing of the film during the second cycle of said film blank advance when the cover is opened and closed again after completion of the first cycle of said film blank advance.

7. A camera including a film blank advance control device for the camera having a cover for use in loading a film in the camera, wherein the camera is adapted, upon closure of the cover, to automatically advance the film to a prescribed position during a first cycle of film blank advance, and wherein the camera is also adapted, upon opening/closing the cover again after completion of the first cycle of said film blank advance, to automatically further advance the film during a second cycle of film blank advance, and wherein said device comprises:
 memory means for storing data representing the completion of the first cycle of said film blank advance; and
 means for indicating that the film is rewound in response to the storing of the data in the memory means representing the completion of the first cycle of said film blank advance and stopping of the advancing of the film before the completion of the second cycle of said film blank advance when the cover is opened and closed again after completion of the first cycle of said film blank advance.

8. A camera including a film blank advance control device for the camera having a cover for use in loading a film in the camera, wherein the camera is adapted, upon closure of the cover, to automatically advance the film to a prescribed position during a first cycle of film blank advance and to rewind the film in a rewind mode, wherein the camera is also adapted, upon opening and closing the cover again after completion of the first cycle of said film blank advance, to automatically further advance the film during a second cycle of film blank advance, and wherein said device comprises:
 memory means for storing data representing the completion of the first cycle of said film blank advance; and
 automatic mode selection means for automatically switching the camera to the rewind mode in response to the storing of the data in the memory means and stopping of the advancing of the film during the second cycle of said film blank advance when the cover is opened and closed again after completion of the first cycle of said film blank advance.

9. A camera including a film blank advance control device for the camera having a cover for use in loading a film in the camera and exposure means for performing an exposure operation for exposing the film, wherein the camera is adapted, upon closure of the cover, to automatically advance the film to a prescribed position during a first cycle of film blank advance, wherein the camera is also adapted, upon opening and closing the cover again after completion of the first cycle of said film blank advance, to automatically further advance the film during a second cycle of film blank advance, and wherein said device comprises:
 memory means for storing data representing the completion of the first cycle of said film blank advance and the occurrence of the performing of the exposure operation by the camera after completion of the first cycle of said film blank advance; and
 means for indicating that the film is rewound in response to the storing of the data representing the completion of the first cycle of said film blank advance and the occurrence of the performing of the exposure operation in said memory means and stopping of the advancing of the film before the completion of the second cycle of said film blank advance when the cover is opened and closed again after the completion of the first cycle of said film blank advance.

10. A camera including a film blank advance control device for the camera having a cover for use in loading a film in the camera and exposure means for performing an exposure operation for exposing the film, wherein said camera is adapted, upon closure of the cover, to automatically advance the film to a prescribed position during a first cycle of film blank advance and to rewind the film in a rewind mode, wherein the camera is also adapted, upon opening and closing the cover again after completion of the first cycle of said film blank advance, to automatically further advance the film during a second cycle of film blank advance, and wherein said device comprises:
 memory means for storing data representing the completion of the first cycle of said film blank advance and the occurrence of the performing of the exposure operation by the camera after the completion of the first cycle of said film blank advance; and
 automatic mode selection means for automatically switching the camera to the rewind mode in response to the storing of the data representing the completion of the first cycle of said film blank advance and the occurrence of the performing of the exposure operation and stopping of the advancing of the film before the completion of the second cycle of said film blank advance when the cover is opened and closed again after the completion of the first cycle of said film blank advance.

11. A camera including a film blank advance control device for use in the camera having a cover for loading a film into the camera, a shutter, and a shutter release, wherein said camera is adapted, upon closure of the cover, to automatically advance the film to a prescribed position during a first cycle of film blank advance, and wherein said camera is also adapted, upon opening and closing the cover again after completion of the first cycle of film blank advance, to automatically further advance the film during a second cycle of film blank advance, wherein said device comprises:
  memory means for storing data representing the completion of the first cycle of film blank advance and actuating of the shutter release of the camera after completion of the first cycle of said film blank advance; and
  means for indicating that the film is rewound in response to the storing of the data representing the completion of the first cycle of said film blank advance and the actuating of the shutter release and stopping of the advancing of the film before completion of the second cycle of said film blank advance when the cover is opened and closed again after the completion of the first cycle of the film blank advance.

12. A camera including a film blank advance control device for the camera having a cover for use in loading a film in the camera, a shutter and a shutter release, wherein the camera is adapted, upon closure of the cover, to automatically advance the film to a prescribed position during a first cycle of film blank advance, wherein said camera is also adapted, upon opening and closing the cover again after completion of the first cycle of film blank advance to automatically further advance the film during a second cycle of film blank advance, and wherein said device comprises:
  memory means for storing data representing the completion of the first cycle of film blank advance and the actuating of the shutter release after completion of the first cycle of said film blank advance; and
  automatic mode selection means for automatically switching the camera to a rewind mode in response to the storing of the data representing the completion of the first cycle of said film blank advance and the actuating of the shutter release in said memory means and stopping of the advancing of the film during the second cycle of said film blank advance when the cover is opened and closed again after completion of the first cycle of said film blank advance.

13. A film blank advance control device for a camera having a cover for use in loading a film in the camera, wherein the camera is adapted, upon closure of the cover, to automatically advance the film to a prescribed position during a first cycle of film blank advance, and wherein the camera is also adapted, upon opening and closing of the cover again after completion of the first cycle of said film blank advance, to automatically further advance the film during a second cycle of said film blank advance, and wherein said device comprises:
  memory means for memorizing the completion of the first cycle of said film blank advance; and
  means for indicating that the film is rewound in response to the memorizing of the completion of the first cycle of said film blank advance and stopping of the advancing of the film before the completion of the second cycle of said film blank advance when the cover is opened and closed again after completion of the first cycle of said film blank advance.

14. A film blank advance control device for a camera having a cover for use in loading a film in the camera, wherein the camera is adapted, upon closure of the cover, to automatically advance the film to a prescribed position during a first cycle of film blank advance and to rewind the film in a rewind mode, wherein the camera is also adapted, upon opening and closing the cover again after completion of the first cycle of said film blank advance, to automatically further advance the film during a second cycle of said film blank advance, and wherein said device comprises:
  memory means for memorizing the completion of the first cycle of said film blank advance; and
  automatic mode selection means for automatically switching the camera to the rewind mode in response to the memorizing of the memory means and stopping of the advancing of the film during the second cycle of said film blank advance when the cover is opened and closed again after completion of the first cycle of said film blank advance.

15. A film blank advance control device for a camera having a cover for use in loading a film in the camera and exposure means for performing an exposure operation for exposing the film, wherein the camera is adapted, upon closure of the cover, to automatically advance the film to a prescribed position during a first cycle of film blank advance, wherein the camera is also adapted, upon opening and closing the cover again after completion of the first cycle of said film blank advance, to automatically further advance the film during a second cycle of said film blank advance, and wherein said device comprises:
  memory means for memorizing the completion of the first cycle of said film blank advance an the occurrence of the performing of the exposure operation by the camera after completion of the first cycle of said film blank advance; and
  means for indicating that the film is rewound in response to the storing of the memorizing of the completion of the first cycle of said film blank advance and the occurrence of the performing of an exposure operation by the camera and stopping of the advancing of the film before the completion of the second cycle of said film blank advance when the cover is opened and closed again after completion of the first cycle of said film blank advance.

16. A film blank advance control device for a camera having a cover for use in loading a film in the camera and exposure means for performing an exposure operation for exposing the film, wherein said camera is adapted, upon closure of the cover, to automatically advance the film to a prescribed position during a first cycle of film blank advance and to rewind the film in a rewind mode, wherein the camera is also adapted, upon opening and closing the cover again after completion of the first cycle of said film blank advance, to automatically further advance the film during a second cycle of film blank advance, and wherein said device comprises:
  memory means for memorizing the completion of the first cycle of said film blank advance and the occurrence of the performing of the exposure operation by the camera after the completion of the first cycle of said film blank advance; and
  automatic mode selection means for automatically switching the camera to the rewind mode in response to the memorizing of the completion of the first cycle of said film blank advance and the occurrence of the performing of the exposure operation and stopping of the advancing of the film before the completion of the second cycle of said film blank advance when the cover is opened and closed again after the completion of the first cycle of said film blank advance.

17. A film blank advance control device for use in a camera having a cover for loading a film into the camera, a shutter, and a shutter release, wherein said camera is adapted, upon closure of the cover, to automatically advance the film to a prescribed position during a first cycle of film blank advance, and wherein said camera is also adapted, upon opening and closing the cover again after completion of the first cycle of said film blank advance, to automatically further advance the film during a second cycle of said film blank advance, wherein said device comprises:

memory means for memorizing the completion of the first cycle of said film blank advance and actuating of the shutter release of the camera after completion of the first cycle of said film blank advance; and means for indicating that the film is rewound in response to the memorizing of the completion of the first cycle of said film blank advance and the actuating of the shutter release and stopping of the advancing of the film before completion of the second cycle of said film blank advance when the cover is opened and closed again after the completion of the first cycle of said film blank advance.

18. A film blank advance control device for a camera having a cover for use in loading a film in the camera, a shutter and a shutter release, wherein the camera is adapted, upon closure of the cover, to automatically advance the film to a prescribed position during a first cycle of film blank advance, wherein said camera is also adapted, upon opening and closing the cover again after completion of the first cycle of said film blank advance to automatically further advance the film during a second cycle of said film blank advance, and wherein said device comprises:

memory means for memorizing the completion of the first cycle of film blank advance and the actuating of the shutter release after completion of the first cycle of said film blank advance; and automatic mode selection means for automatically switching the camera to a rewind mode in response to the memorizing of the completion of the first cycle of said film blank advance and the actuating of the shutter release in said memory means and stopping of the advancing of the film during the second cycle of said film blank advance when the cover is opened and closed again after completion of the first cycle of said film blank advance.

19. A camera having a cover for use in loading a film in the camera, wherein the camera is adapted, upon closure of the cover, to automatically advance the film to a prescribed position during a first cycle of film blank advance, and wherein the camera is also adapted, upon opening and closing the cover again after completion of the first cycle of said film blank advance, to automatically further advance the film during a second cycle of said film blank advance, and wherein said camera comprises:

memory means for memorizing the completion of the first cycle of said film blank advance; and means for indicating that the film is rewound in response to the memorizing of the completion of the first cycle of said film blank advance and stopping of the advancing of the film before the completion of the second cycle of said film blank advance when the cover is opened and closed again after completion of the first cycle of said film blank advance.

20. A camera having a cover for use in loading a film in the camera, wherein the camera is adapted, upon closure of the cover, to automatically advance the film to a prescribed position during a first cycle of film blank advance and to rewind the film in a rewind mode, wherein the camera is also adapted, upon opening and closing the cover again after completion of the first cycle of said film blank advance, to automatically further advance the film during a second cycle of said film blank advance, and wherein said camera comprises:

memory means for memorizing the completion of the first cycle of said film blank advance; and automatic mode selection means for automatically switching the camera to the rewind mode in response to the memorizing of the memory means and stopping of the advancing of the film during the second cycle of said film blank advance when the cover is opened and closed again after completion of the first cycle of said film blank advance.

21. A camera having a cover for use in loading a film in the camera and exposure means for performing an exposure operation for exposing the film, wherein the camera is adapted, upon closure of the cover, to automatically advance the film to a prescribed position during a first cycle of said film blank advance, wherein the camera is also adapted, upon opening and closing the cover again after completion of the first cycle of said film blank advance, to automatically further advance the film during a second cycle of said film blank advance, and wherein said camera comprises:

memory means for memorizing the completion of the first cycle of said film blank advance and the occurrence of the performing of the exposure operation by the camera after completion of the first cycle of said film blank advance; and means for indicating that the film is rewound in response to the memorizing of the completion of the first cycle of said film blank advance and the occurrence of the performing of the exposure operation and stopping of the advancing of the film before the completion of the second cycle of said film blank advance when the cover is opened and closed again after the completion of the first cycle of said film blank advance.

22. A camera having a cover for use in loading a film in the camera and exposure means for performing an exposure operation for exposing the film, wherein said camera is adapted, upon closure of the cover, to automatically advance the film to a prescribed position during a first cycle of film blank advance and to rewind the film in a rewind mode, wherein the camera is also adapted, upon opening and closing the cover again after completion of the first cycle of said film blank advance, to automatically further advance the film during a second cycle of said film blank advance, and wherein said camera comprises:

memory means for memorizing the completion of the first cycle of said film blank advance and the occurrence of the performing of the exposure operation by the camera after the completion of the first cycle of said film blank advance; and automatic mode selection means for automatically switching the camera to the rewind mode in response to the memorizing of the completion of the first cycle of said film blank advance an the occurrence of the performing of the exposure operation and stopping of the advancing of the film before the completion of the second cycle of said film blank advance when the cover is opened and closed again after the completion of the first cycle of said film blank advance.

23. A camera having a cover for loading a film into the camera, a shutter, and a shutter release, wherein said camera is adapted, upon closure of the cover, to automatically advance the film to a prescribed position during a first cycle of film blank advance, and wherein said camera is also adapted, upon opening and closing the cover again after completion of the first cycle of film blank advance, to automatically further advance the film during a second cycle of said film blank advance, wherein said camera comprises:
   memory means for memorizing the completion of the first cycle of said film blank advance and actuating of the shutter release of the camera after completion of the first cycle of said film blank advance; and
   means for indicating that the film is rewound in response to the memorizing of the completion of the first cycle of said film blank advance and the actuating of the shutter release and stopping of the advancing of the film before completion of the second cycle of said film blank advance when the cover is opened and closed again after the completion of the first cycle of said film blank advance.

24. A camera having a cover for use in loading a film in the camera, a shutter and a shutter release, wherein the camera is adapted, upon closure of the cover, to automatically advance the film to a prescribed position during a first cycle of film blank advance, wherein said camera is also adapted, upon opening and closing the cover again after completion of the first cycle of film blank advance to automatically further advance the film during a second cycle of film blank advance, and wherein said camera comprises:
   memory means for memorizing the completion of the first cycle of film blank advance and the actuating of the shutter release after completion of the first cycle of said film blank advance; and
   automatic mode selection means for automatically switching the camera to a rewind mode in response to the memorizing of the completion of the first cycle of said film blank advance and the actuating of the shutter release in said memory means and stopping of the advancing of the film during the second cycle of said film blank advance when the cover is opened and closed again after completion of the first cycle of said film blank advance.

* * * * *

UNITED STATES PATENT AND TRADEMARK OFFICE
CERTIFICATE OF CORRECTION

PATENT NO. : 4,982,212
DATED : January 1, 1991
INVENTOR(S) : KIYOSHI ALYFUKU

It is certified that error appears in the above-identified patent and that said Letters Patent is hereby corrected as shown below:

On the title page, insert item

[63] Related U.S. Application Data:

Insert: --Continuation of application Ser. No. 945,556, filed Dec. 23, 1986.--

COLUMN 9

Line 18, "tie" should read --time--.

COLUMN 10

Line 35, "o" should read --to--.

COLUMN 12

Line 29, "gate 315" should read --gate 316--.

COLUMN 20

Line 68, "an" should read --and--.

Signed and Sealed this

Twenty-fourth Day of September, 1991

Attest:

HARRY F. MANBECK, JR.

Attesting Officer     Commissioner of Patents and Trademarks